United States Patent Office 3,358,740
Patented Dec. 19, 1967

3,358,740
SALT WATER CONCENTRATION WITH ALUMINA-SILICA ADDITIVE AND SEPARATION OF SODIUM SULFATE-CALCIUM SULFATE DOUBLE SALT
Shinkichi Akimoto, Hodogaya-ku, Yokohama, Japan, assignor to Kurita Industrial Company Limited, Osaka, Japan, a corporation of Japan
No Drawing. Filed Nov. 4, 1963, Ser. No. 321,288
Claims priority, application Japan, Dec. 31, 1962, 38/320; Feb. 27, 1963, 38/9,837
7 Claims. (Cl. 159—47)

This invention relates to a method for concentrating salt water such as sea water, sea brine, and natural brine.

When salt water, for example sea water, is concentrated by heating, bicarbonate ions in the solution are subjected to thermal decomposition, releasing carbon dioxide and at the same time forming calcium carbonate and magnesium hydroxide which form scale on the heating surfaces, thereby the heat conductivity is reduced. Furthermore, hydrochloric acid is produced as a result of the thermal decomposition of magnesium chloride at the surfaces having scale adhered thereto, and corrosion of the apparatus is increased by the produced hydrochloric aicd as well as by the carbon dioxide.

There have been various proposals for mitigating the difficulty but none of them satisfy industrial requirements.

It is, therefore, an object of the present invention to provide a process for concentrating the salt water without the defects described above and which prevents formation of scale effectively in which salt water is concentrated in existence of a kind of or many kinds of the material selected among silica, alumina or alumino silicate etc., thereby bicarbonate ion involved in salt water is converted to non crystalline $MgCO_3$ without inducing of formation of scale as crystalline $CaCO_3$. Further, another object of this invention is to remove $SO_4^{--}$ in mother liquid as in form of $Na_2SO_4 \cdot CaSO_4$ type double salts, on extracting and utilizing components contained in salt water by concentration, $SO_4^{--}$ is undesirable at each step of procedure and complicates the separation of components each other and forms the main cause for lowering the quality of products, so that various methods for removing these defects have been attempted heretofore. However in all of them separation was difficult and cost was high and especially in case reagents were added, as solvent, to salt water, such reagents were used as an aqueous solution, and as a consequence, the addition of such solution decreased the efficiency of the operation because the solution served to dilute the liquid which was to be concentrated. In the method of the present invention, either calcium chloride or, solid $CaSO_4 \cdot 2H_2O$ is added directly to produce $Na_2SO_4 \cdot CaSO_4 \cdot 3H_2O$, a double salt.

As described above, in order to prevent formation of scale, many methods have been proposed already, for example, method for operating in the condition containing 1–3% of $CaCO_3$ and $Mg(OH)_2$ in heated salt water, method for preventing the formation of scale in which bicarbonate ion is decomposed by adding $FeCl_2 \cdot 6H_2O$ is converted to $Fe(OH)_2$, and the method in which mineral acid is added to salt water to be treated and so on. But these methods have the defects that expected effects cannot be obtained or corrosion of the apparatus is increased etc., and can not bring satisfactory result.

As a preliminary step to obtain an improved method of preventing the formation of scale, the inventor has conducted the following two experiments.

*Experiment I*

7 liters of sea water boiled and evaporated under direct heating and agitation to obtain a concentration of 18.8 Bé. The materials separated in this process were analysed and the following result was obtained as shown in Table I.

TABLE I

| | $CaCO_3$ | $Mg(OH)_2$ | $MgCO_3$ | $Na_2SO_4 \cdot CaSO_4$ | $CaSO_4$ | Total |
|---|---|---|---|---|---|---|
| Grams | 0.2496 | 0.0226 | 0.0530 | 1.6260 | 4.1254 | 6.0766 |
| Percent | 4.108 | 0.372 | 0.872 | 26.756 | 67.891 | |

All the materials described above adhered to the surface of the heater and formed scale.

*Experiment II*

Nitric acid to neutralize the alkalinity was added to sea water as used in Experiment I and the experiment was repeated. The result shown in Table II was obtained.

TABLE II

| | $CaCO_3$ | $Mg(OH)_2$ | $MgCO_3$ | $Na_2SO_4 \cdot 5CaSO_4 \cdot 3H_2O$ | $CaSO_4 \cdot \frac{1}{2}H_2O$ | Total |
|---|---|---|---|---|---|---|
| Grams | 0.0075 | 0.0474 | 0 | 7.0674 | 1.4712 | 8.5934 |
| Percent | 0.087 | 0.551 | 0 | 82.242 | 17.120 | |

In this case, separated materials were wholly in floating state in the heating liquid and where not changed to scale. Separated materials in two experiments described above are as shown in tables, but observation of phenomena during evaporation is also of interest. Namely, in Experiment I, at beginning of heating, evaporated bubbles come out of only the area surrounding the agitating blades showing bubbling condition, but when $CaCO_3$ begins to adhere to the heating wall following advancement of concentration, evaporated bubbles move to the adhered surface and thereafter bubbling took place only on the heating surface.

These observed facts and the result shown in Table I teach that the scale formation comes from following steps, namely adhesion to the heating surface of $CaCO_3$ produced as a result of decomposition of bicarbonate, and following advancing of concentration of $CaSO_4$ as $CaSO_4 \cdot \frac{1}{2}H_2O$, and on further concentration $Na_2SO_4 \cdot 5CaSO_4 \cdot 3H_2O$ is separated. These were heated further and following reactions occurred resulting in solidifications.

$$CaSO_4 \cdot 2H_2O \rightarrow CaSO_4 \cdot \frac{1}{2}H_2O + 1\frac{1}{2}H_2O$$
$$CaSO_4 \cdot \frac{1}{2}H_2O \rightarrow CaSO_4 + \frac{1}{2}H_2O$$
$$Na_2SO_4 \cdot 5CaSO_4 \cdot 3H_2O \rightarrow Na_2SO_4 \cdot CaSO_4 + 4CaSO_4 + 3H_2O$$

Referring to the sea water used in Experiment II, bicarbonate ion was decomposed by neutralization and could not exist in the heated liquid, so that $CaCO_3$ as the basis for the induction of separation of solid, could not be obtained and as a result there was no formation of scale.

From the results of the experiments described above and observations therefor, the inventor studied a suitable neutralizing means under presumption that when the alkalinity in sea water is neutralized same result may be obtained notwithstanding whatever neutralizing means may be adopted, and as a result it was found that materials such as silica, silicic acid, alumina, alumino silicate of kaolin, acid clay, bentonite and zeolite etc., are very suitable neutralizing material for this purpose. This invention is based on this novel finding. When the material is added to sea water and heated for concentration, the greater part of alkali content of sea water disappears and pH is lowered from 8.3 to 7; separation of $CaCO_3$ is restrained and only $MgCO_3$ can remain in the liquid and scale does not appear at all. And yet the quantity of the addition is in order of only 0.1% of sea water and moreover even in the state that the scale has appeared already when the material is added, scale can be separated, and this is excellent effect.

EXAMPLE I

Using a glass vessel, 5 liters of sea water were evaporated until scale appeared on the heating wall. Then 1 gr. of silicic acid was added thereto and 2 liters of fresh sea water were added and heating was continued. The scale adhered was removed perfectly. The separated materials were filtered and washed with alcohol and ether and analysed as shown in the following Table III.

TABLE III

| Specific gravity | Baumé | | $CaCO_3$ | $MgCO_3$ | $Na_2SO_4 \cdot 5CaSO_4 \cdot 3H_2O$ | $CaSO_4 \cdot \frac{1}{2}H_2O$ | Total |
|---|---|---|---|---|---|---|---|
| 1.14708 | 18.5 | Grams | 0.1243 | 0.6813 | 7.0005 | 0.0526 | 7.858 |
| | | | 1.583 | 8.669 | 89.079 | 0.669 | 100.00 |

In this example, the reason that the amount of $CaCO_3$ contained showed a rather larger value than that of Example II, may be that the parts contained in the inner part of the scale could not be brought into direct contact with solution.

EXAMPLE II

The evaporating tests as in Example I were made by application of various kinds of the material at the beginning of heating and the results obtained are shown in Table IV. In all six examples employing silicic acid, alumina, bentonite, etc., scale did not appear and all separated materials floated in the liquid and white muddy suspension was obtained.

(1) No change appears, in the infrared spectrophotometry of the material before and after evaporation;
(2) There is no change in chemical constitution;
(3) Function of the material is endurable for continuous usage;
(4) When silicic acid is heated, solubility shows the value of 200 p.p.m., but it separates silicic acid on heating and concentration;

Further explanation referring to detailed investigation is omitted, as it is not intended that the scope of the invention should be limited by any theoretical explanation.

By the way, in this heating concentration, when $CaCl_2$ is added, in the presence of the material in step of concentration, $CaSO_4$ is separated in the first place but in progress of concentration a double salt of $Na_2SO_4 \cdot CaSO_4$ type appears in the form of a suspension in the heating liquid. Accordingly, it is appreciated that all $SO_4^{--}$ becomes $CaSO_4$ and scale formation is prevented.

In this case, it is also assured that double salt of $CaSO_4$ and $Na_2SO_4 \cdot CaSO_4$ type may be separated respectively in the form such as $$CaSO_4 \cdot 2H_2O, \quad CaSO_4 \cdot \tfrac{1}{2}H_2O, \quad 2Na_2SO_4 \cdot CaSO_4 \cdot 2H_2O$$
$$Na_2SO_4 \cdot 5CaSO_4 \cdot 3H_2O \text{ and } Na_2SO_4 \cdot CaSO_4$$

etc., according to temperature and concentration of the heating liquid.

Ordinarily, $Na^+$ in salt water is considered to be separated as NaCl by heating concentration, but in this invention it can be separated in a form of double salt as $Na_2SO_4 \cdot CaSO_4$, so that the process may be varied if necessary, and the process can be adopted freely in broad extent such as manufacture of electrolyte by diaphragm process, or manufacture of magnesium hydroxide from sea brine and bittern, or extraction of $Na^+$ in salt water as $Na_2SO_4$. In converting $SO_4$ ions contained in salt water to a bodouble salt, the following several methods may be considered. In case the addition of $Ca^{++}$ for example, $CaCl_2$ is adopted, the amount of the latter is determined on the $SO_4^{--}$ content in the salt water. In case $CaSO_4$ is suspended in the salt water, or in case $CaSO_4 \cdot 2H_2O$ in the suspended state is added to the sea water, the upper

TABLE IV

| Addition material (quantity) | Separated mother liquid | | | Material separated | | | | |
|---|---|---|---|---|---|---|---|---|
| | Specific gravity | Baumé | | $CaCO_3$ | $MgCO_3$ | $Na_2SO_4 \cdot 5CaSO_4 \cdot 3H_2O$ | $CaSO_4 \cdot \frac{1}{2}H_2O$ | Total |
| Silicic acid (1 g./11 l.) | 1.13651 | 17.3 | Grams | 0.0057 | 0.4740 | 5.9761 | 0.5870 | 7.0428 |
| | | | Percent | 0.081 | 6.750 | 84.855 | 8.334 | |
| Alumina (2 g./8 l.) | 1.13609 | 17.3 | Grams | 0.0824 | 1.3128 | 4.0250 | 0.4577 | 5.8779 |
| | | | Percent | 1.082 | 22.334 | 68.476 | 7.788 | |
| Bentonite (2 g./8 l.) | 1.14438 | 18.2 | Grams | 0.0383 | 0.7937 | 5.8190 | 1.7293 | 8.3722 |
| | | | Percent | 0.457 | 9.480 | 69.407 | 20.656 | |
| Acid clay (2 g./8 l.) | 1.1382 | 14.7 | Grams | 0.1162 | 0.6148 | 3.7745 | 0.0626 | 4.5682 |
| | | | Percent | 2.543 | 13.459 | 82.626 | 13.712 | |
| Kaolin (3 g./8 l.) | 1.13380 | 17.0 | Grams | 0 | 0.4337 | 2.0960 | 0.9176 | 3.4473 |
| | | | Percent | 0 | 12.581 | 60.802 | 26.617 | |
| Silica plus Acid clay (0.5 g.+0.5 g./8 l.) | 1.1119 | 15.4 | Grams | 0.0219 | 0.1217 | 0.5156 | 0.1327 | 0.7919 |
| | | | Percent | 2.771 | 15.367 | 65.107 | 16.754 | |

EXAMPLE III

Evaporation tests were made in the same way as in Examples I and II except that an iron vessel was used in place of glass. The results were the same as obtained in Examples I and II and no corrosion of the iron vessel was seen.

limit of the amount to be added is determined depending on the $Na^+$ content in the salt water. $CaSO_4$ which is added to the heated salt water reacts in the following manner, namely:

$$CaSO_4 + 2NaCl \rightarrow Na_2SO_4 + CaCl_2$$
$$Na_2SO_4 + 5CaSO_4 + 3H_2O \rightarrow Na_2SO_4 \cdot 5CaSO_4 \cdot 3H_2O$$

and accumulation of CaCl₂ increases gradually and accordingly SO₄⁻⁻ in salt water reacts as follows:

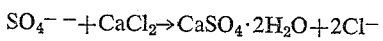

thereby double salt is formed.

Accordingly, Na⁺ contained in salt water can be fixed as Na₂SO₄ in form of double salt, while the double salt which is separated at the beginning serves as seed crystals and is formed in large crystals. Since

which has separated is present in the form of suspension in the heated liquid, it can be discharged from the heating-still together with the concentrated liquid correspondingly, in amount, to the added salt water if an overflow pipe is provided in the heating-concentrating vessel. Since the discharged double salt is produced in large crystals, it precipitates rapidly if left undisturbed and thus it can be separated easily from the concentrated liquid. By subjecting the separated salt to hydrolysis, Na₂SO₄ becomes dissolved and CaSO₄·2H₂O can be separated as crystals. Na₂SO₄ solution obtained can be used as raw material of anhydrous Glauber's salt, while CaSO₄·2H₂O is used repeatedly for producing double salt. As described above, Na⁺ contained in salt liquid can be obtained as Na₂SO₄ from salt liquid and at the same time desulfurization can be carried out.

The temperature for producing Na₂SO₄·5CaSO₄·3H₂O is 93° C., but when CaSO₄·2H₂O is added directly to salt water double salt is produced and separated instantaneously and no time is given for crystal growth so that fine crystals with high surface area per unit weight are obtained, resulting in an increased amount of the adhering mother liquid. The Na₂SO₄ solution obtainable by hydrolysis then becomes impure, and therefore, attention must be paid so as to obtain as large crystals as possible, while giving ample time for the growth of crystals to obtain minimum surface area per unit weight. This is illustrated in the following experiments.

*Experiment III*

10 g. of CaSO₄·2H₂O is added to 200 ml. of sea brine at 18.9° Bé. and heated, then at 93° C., fluidity of liquid is lost and the mass becomes pasty. Next separating the crystal, the composition was found to be 98.67% of Na₂SO₄·5CaSO₄·3H₂O and 1.33% CaSO₄·½H₂O.

*Experiment IV*

While sea brine at 18.9° Bé. is heated, sea water (1.365 g./l. of CaCl₂ added) corresponding to the amount of vaporized part thereof is added, then 4.2 g./l. of double salt can be obtained.

*Experiment V*

While sea brine at 18.9° Bé. is heated, sea water (suspended at the rate of CaSO₄·2H₂O 2 g./l.) corresponding to the amount of vaporized part thereof is added, and 10.1 g./l. of double salt was obtained.

The result obtained by analyzing the amount of mother liquid adhered (cc./g.) shaked off from the double salt obtained by said experiments using centrifugal separating machine showed the following value:

| | Cc. |
|---|---|
| Experiment III | 0.551 |
| Experiment IV | 0.096 |
| Experiment V | 0.122 |

This shows that Experiments IV, V, give more time to crystal growth in comparison with Experiment III and becomes larger one so that surface area per unit weight is small, accordingly the amount of mother liquid adhered is smaller.

On collection and utilization of the components contained in salt water, SO₄⁻⁻ hinders every step, complicates separation of components each other and lowers the quality of the products, so that various methods for removing these defects have been proposed, but as described above, every one is costly and separation is difficult especially when agents are added because the concentrated liquid becomes diluted because such agents are used in the form of solution and as a natural result the efficiency of operation is lowered. According to the method of this invention, solid CaSO₄·2H₂O is added directly to salt water and can be recovered as Na₂SO₄·CaSO₄·3H₂O, and thus removable of sulfate from the raw material can be maintained, so that it is very advantageous.

EXAMPLE IV 10 g. of CaSO₄·2H₂O is added to 200 ml. of sea brine at 20.3° Bé. Then 1.0 gr. of silicic acid was added thereto and after heating the mixture liquid, a part of the mixture was taken as the mother liquid I, and further CaSO₄·2H₂O was added to the remaining mother liquid I, and was heated. A part of the latter liquid was taken as the liquid II. These sample liquids I and II were analysed with respect to the composition and the degree of the residual SO₄ ions. The results are shown in the following Table V.

TABLE V

| | Original sea brine | I | II |
|---|---|---|---|
| Specific gravity (°Bé.) | 20.3 | 20.7 | 21.8 |
| CaO (g./l.) | 1.127 | 2.819 | 4.000 |
| MgO (g./l.) | 15.855 | 17.690 | 18.973 |
| Cl (g./l.) | 132.014 | 142.203 | 158.151 |
| SO₄ (g./l.) | 13.287 | 8.415 | 3.883 |
| Rate of sulfate conversion to double salt (percent) | | 36.94 | 70.02 |

What I claim is:

1. In a method for concentrating salt water, the improvement comprising evaporating water from said salt water in the presence of at least one additive selected from the group consisting of silica, silicic acid, alumina, an aluminosilicate, acid clay, kaolin, and bentonite to reduce scale formation.

2. A method according to claim 1, wherein said additive is silicic acid.

3. A method for concentrating salt water and for converting sulfate ions in the salt water to a double salt, comprising the steps of evaporating water from said salt water in the presence of (a) at least one additive selected from the group consisting of silicia, silicic acid, alumina, an aluminosilicate, acid clay, kaolin, and bentonite and (b) a calcium compound selected from the group consisting of calcium chloride and calcium sulfate, whereby scale formation is reduced and sulfate ions originally present in the salt water are converted to a sodium sulfate-calcium sulfate double salt.

4. A method according to claim 3, wherein said calcium compound is calcium sulfate, and said calcium sulfate forms a suspension in the salt water.

5. A method according to claim 3, further comprising separating the produced double salt, and subjecting the double salt to hydrolysis to separate the double salt into sodium sulfate and calcium sulfate dihydrate.

6. A process according to claim 5, wherein the calcium sulfate dihydrate is recycled for use in forming additional double salt.

7. A method according to claim 3, wherein the temperature during evaporation is approximately 93° C.

References Cited

UNITED STATES PATENTS

| 2,403,174 | 7/1946 | Ernst. | |
| 2,733,196 | 1/1956 | Hillier | 203—7 |
| 2,979,442 | 4/1961 | Badger | 203—7 |
| 3,000,795 | 9/1961 | Goeldner | 203—7 X |
| 3,119,752 | 1/1964 | Checkovich | 203—34 |
| 3,218,241 | 11/1965 | Checkovich | 203—34 |
| 3,248,181 | 4/1966 | Akimoto | 23—304 X |
| 3,262,865 | 7/1966 | Waters | 207—7 |

NORMAN YUDKOFF, *Primary Examiner.*